(12) United States Patent
Miles

(10) Patent No.: US 10,243,831 B2
(45) Date of Patent: Mar. 26, 2019

(54) LINKED NETWORK SCORING UPDATE

(71) Applicant: SAS Institute Inc., Cary, NC (US)

(72) Inventor: Brian Oneal Miles, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 537 days.

(21) Appl. No.: 14/228,530

(22) Filed: Mar. 28, 2014

(65) Prior Publication Data

US 2015/0120647 A1    Apr. 30, 2015

Related U.S. Application Data

(60) Provisional application No. 61/895,133, filed on Oct. 24, 2013.

(51) Int. Cl.
| | |
|---|---|
| *G06F 17/30* | (2006.01) |
| *H04L 12/751* | (2013.01) |
| *H04L 12/24* | (2006.01) |
| *H04L 12/26* | (2006.01) |
| *G06N 5/04* | (2006.01) |

(52) U.S. Cl.
CPC ........ *H04L 45/02* (2013.01); *G06F 17/30345* (2013.01); *G06N 5/048* (2013.01); *H04L 41/142* (2013.01); *H04L 43/04* (2013.01)

(58) Field of Classification Search
CPC ....... H04L 45/02; H04L 41/142; H04L 43/04; G06F 17/30345; G06F 5/048
See application file for complete search history.

(56) References Cited

U.S. PATENT DOCUMENTS

| | | | |
|---|---|---|---|
| 8,117,281 B2 | 2/2012 | Robinson et al. | |
| 8,244,830 B2 | 8/2012 | Robinson et al. | |
| 8,539,359 B2 | 9/2013 | Rapaport et al. | |
| 8,560,557 B1 | 10/2013 | Poe | |
| 8,606,787 B1* | 12/2013 | Asgekar | G06Q 50/01 707/737 |
| 2001/0034793 A1 | 10/2001 | Madruga et al. | |
| 2005/0201290 A1* | 9/2005 | Vasudev | H04L 45/12 370/238 |
| 2008/0263034 A1 | 10/2008 | Dey et al. | |
| 2009/0034419 A1 | 2/2009 | Flammer, III et al. | |
| 2009/0059816 A1 | 3/2009 | Reza et al. | |
| 2009/0182810 A1 | 7/2009 | Higgins et al. | |

(Continued)

*Primary Examiner* — Kristopher Andersen
*Assistant Examiner* — James E Heffern
(74) *Attorney, Agent, or Firm* — Bell & Manning, LLC

(57) ABSTRACT

A method of updating a score in a network of linked nodes is provided. Scoring information including a node identifier and a score value for a node in a network of nodes is received. The score value is determined using an analytic model and a parameter value. An anchored network record for which the node is an anchor is identified using the node identifier. A node record for the node is identified in the identified anchored network record. A network score value is computed based on the score value. The identified node record is updated with the score value and the computed network score value. A next anchored network record that includes the node is identified using the node identifier. A second node record for the node is identified in the identified next anchored network record. The second node record is updated based on the updated, identified node record.

30 Claims, 13 Drawing Sheets

(56) References Cited

U.S. PATENT DOCUMENTS

| | | |
|---|---|---|
| 2010/0215051 A1 | 8/2010 | Solis et al. |
| 2011/0276396 A1 | 11/2011 | Rathod |
| 2012/0124086 A1 | 5/2012 | Song et al. |
| 2012/0136828 A1 | 5/2012 | Darcy |
| 2012/0180135 A1 | 7/2012 | Hodges et al. |
| 2012/0185539 A1* | 7/2012 | Zhu ................. G06Q 50/01 709/204 |
| 2012/0311040 A1 | 12/2012 | Sherzer |
| 2013/0080242 A1 | 3/2013 | Alhadeff et al. |
| 2013/0163471 A1* | 6/2013 | Indukuri ............ G06Q 10/00 370/255 |
| 2013/0254305 A1 | 9/2013 | Cheng et al. |
| 2014/0129551 A1 | 5/2014 | Markus et al. |
| 2014/0215055 A1* | 7/2014 | Reynolds ............ H04L 43/08 709/224 |
| 2015/0092606 A1 | 4/2015 | Kelsey et al. |
| 2015/0117254 A1 | 4/2015 | Miles |
| 2015/0117262 A1 | 4/2015 | Miles |
| 2015/0201309 A1 | 7/2015 | Liu |

\* cited by examiner

US 10,243,831 B2

LINKED NETWORK SCORING UPDATE

CROSS-REFERENCE TO RELATED APPLICATIONS

The present application claims the benefit of priority under 35 U.S.C. § 119(e) to U.S. Provisional Patent Application No. 61/895,133 filed Oct. 24, 2013, the entire contents of which are hereby incorporated by reference. The present application is related by subject matter to a U.S. patent application titled "LINK ADDITION TO A NETWORK OF LINKED NODES" Ser. No. 14/228,595, the entire contents of which are hereby incorporated by reference. The present application is further related by subject matter to a U.S. patent application titled "OBJECT STORE CREATION" Ser. No. 14/228,666, the entire contents of which are hereby incorporated by reference.

BACKGROUND

Predictive analytic approaches tend to focus on scoring information to estimate a likelihood of an outcome or event for a particular entity such as an individual, a company, etc. Growth in data and increased data availability over time has increased the opportunity to link entities and develop analytic models based on associations between entities. Similar to entity scoring, a linked network of entities can also be scored to estimate the likelihood of the outcome or event.

SUMMARY

In an example embodiment, a method of updating a score in a network of linked nodes is provided. Scoring information for a node in a network of nodes is received. The scoring information includes a node identifier and a score value. The score value is determined using an analytic model. An anchored network record for which the node is an anchor is identified using the node identifier. A node record for the node is identified in the identified anchored network record. A network score value included in the identified node record is computed based on the score value. The identified node record is updated with the score value and the computed network score value. A next anchored network record that includes the node is identified using the node identifier. A second node record for the node is identified in the identified next anchored network record. The second node record is updated based on the updated, identified node record.

In another example embodiment, a computer-readable medium is provided having stored thereon computer-readable instructions that, when executed by a computing device, cause the computing device to perform the method of updating a score in a network of linked nodes.

In yet another example embodiment, a system is provided. The system includes, but is not limited to, a processor and a computer-readable medium operably coupled to the processor. The computer-readable medium has instructions stored thereon that, when executed by the processor, cause the system to perform the method of updating a score in a network of linked nodes.

Other principal features of the current disclosure will become apparent to those skilled in the art upon review of the following drawings, the detailed description, and the appended claims.

BRIEF DESCRIPTION OF THE DRAWINGS

Illustrative embodiments will be described referring to the accompanying drawings, wherein like numerals denote like elements.

DETAILED DESCRIPTION

Figure 1:
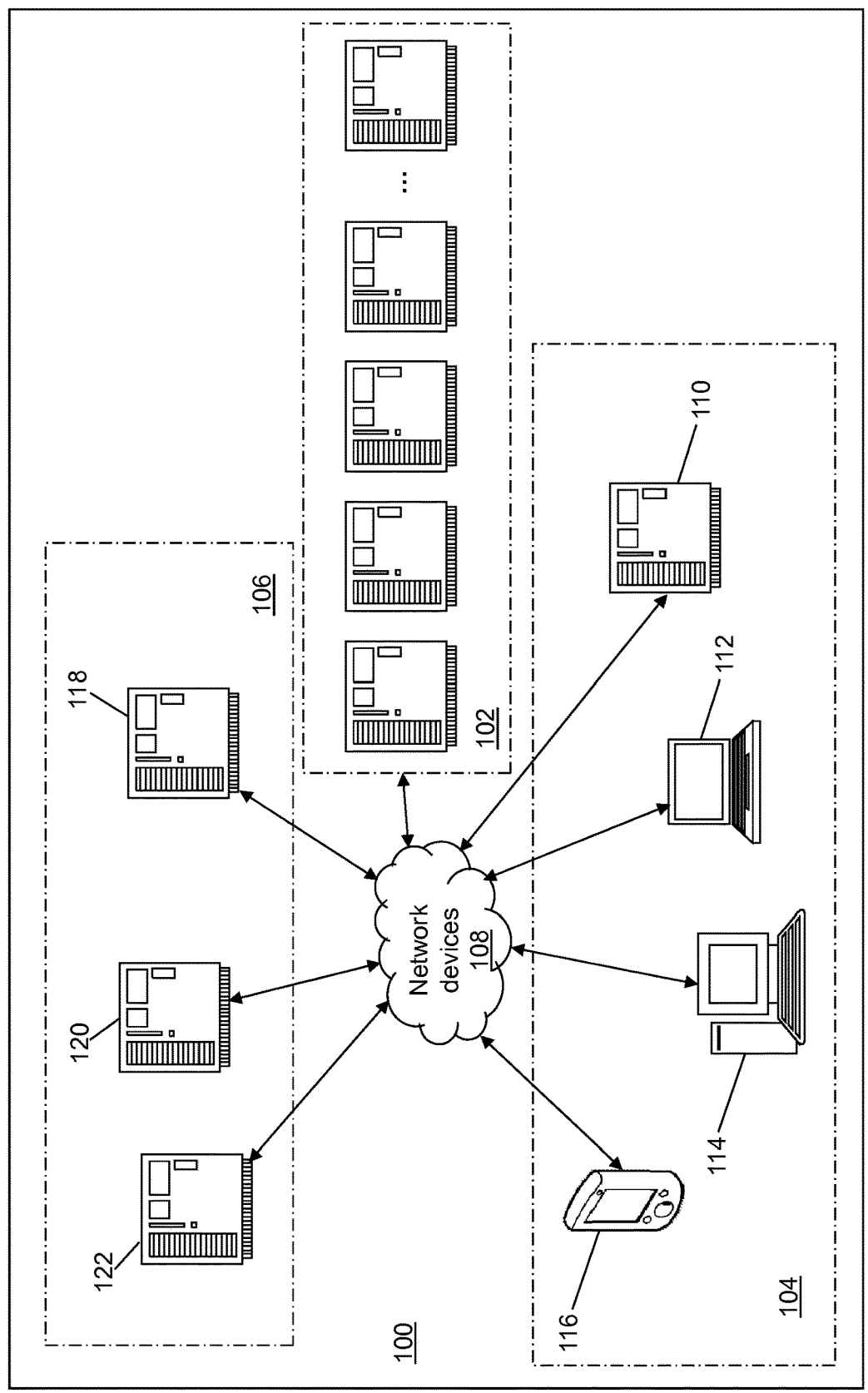
FIG. 1 depicts a block diagram of a scoring network system in accordance with an illustrative embodiment.

Referring to FIG. 1, a block diagram of a scoring network system 100 is shown in accordance with an illustrative embodiment. In an illustrative embodiment, scoring network system 100 may include a network processing system 102, network interaction systems 104, interaction monitoring systems 106, and network devices 108. The components of scoring network system 100 may be positioned in a single room or adjacent rooms, in a single facility, and/or may be distributed geographically from one another.

One or more users use a computing device of the network interaction systems 104 to generate data related to an entity. The entity may be the user. For example, the user may enter data about themselves or may enter data about an entity, or both. As used herein, the data may include any type of content represented in any computer-readable format such as binary, alphanumeric, numeric, string, markup language, etc. The content may include textual information, graphical information, image information, audio information, numeric information, etc. The data further may be generated based on an interaction with the computing device. For example, the user may navigate between websites, which generates data associated with the navigation. The entity is considered a node in a network of nodes.

The generated data is received by one or more of the interaction monitoring systems 106. The interaction monitoring systems 106 generate a score value using an analytic model and the data generated by the node. Network processing system 102 receives the score value and information identifying the node and updates a node score and a network score for the node and possibly node and network scores for one or more other nodes in the network linked to the node.

Network devices 108 may include one or more network devices of the same or different types to form any type of wired and/or wireless public or private network including a cellular network, a local area network, a wide area network such as the Internet, etc. Example network devices 108 include routers, switches, hubs, modems, etc. Network devices 108 further may comprise sub-networks and consist of any number of devices.

In the illustrative embodiment, network processing system 102 is represented as a plurality of server computing devices though network processing system 102 may include one or more computing devices of any form factor that may be organized into subnets. For example, network processing system 102 can include a single computing device. Network processing system 102 can be configured as a grid of computers. Network processing system 102 can be implemented, for example, as a multi-node Hadoop® cluster, as understood by a person of skill in the art. Apache™ Hadoop® is an open-source software framework for distributed computing. The computing devices of network processing system 102 send and receive signals through network devices 108 to/from another of the one or more computing devices of network processing system 102 and/or to/from interaction monitoring systems 106 using various transmission media that may be wired and/or wireless as understood by those skilled in the art.

The network interaction systems 104 can include any number and type of computing devices that may be organized into subnets. The computing devices of the network interaction systems 104 send and receive signals through network devices 108 to/from another of the one or more computing devices of the network interaction systems 104 and/or to/from the interaction monitoring systems 106. The one or more computing devices of the network interaction systems 104 may include computers of any form factor such as a server 110, a laptop 112, a desktop 114, a smart phone 116, a personal digital assistant, an integrated messaging device, a tablet computer, etc. The one or more computing devices of the network interaction systems 104 may communicate using various transmission media that may be wired and/or wireless as understood by those skilled in the art.

In the illustrative embodiment, the interaction monitoring systems 106 are represented as a plurality of server computing devices, a first server 118, a second server 120, and a third server 122, though the interaction monitoring systems 106 may include one or more computing devices of any form factor that may be organized into subnets. The computing devices of the interaction monitoring systems 106 send and receive signals through network devices 108 to/from another of the one or more computing devices of the interaction monitoring systems 106, to/from network processing system 102, and/or to/from the network interaction systems 104. The one or more computing devices of the interaction monitoring systems 106 may communicate using various transmission media that may be wired and/or wireless as understood by those skilled in the art.

Figure 2:
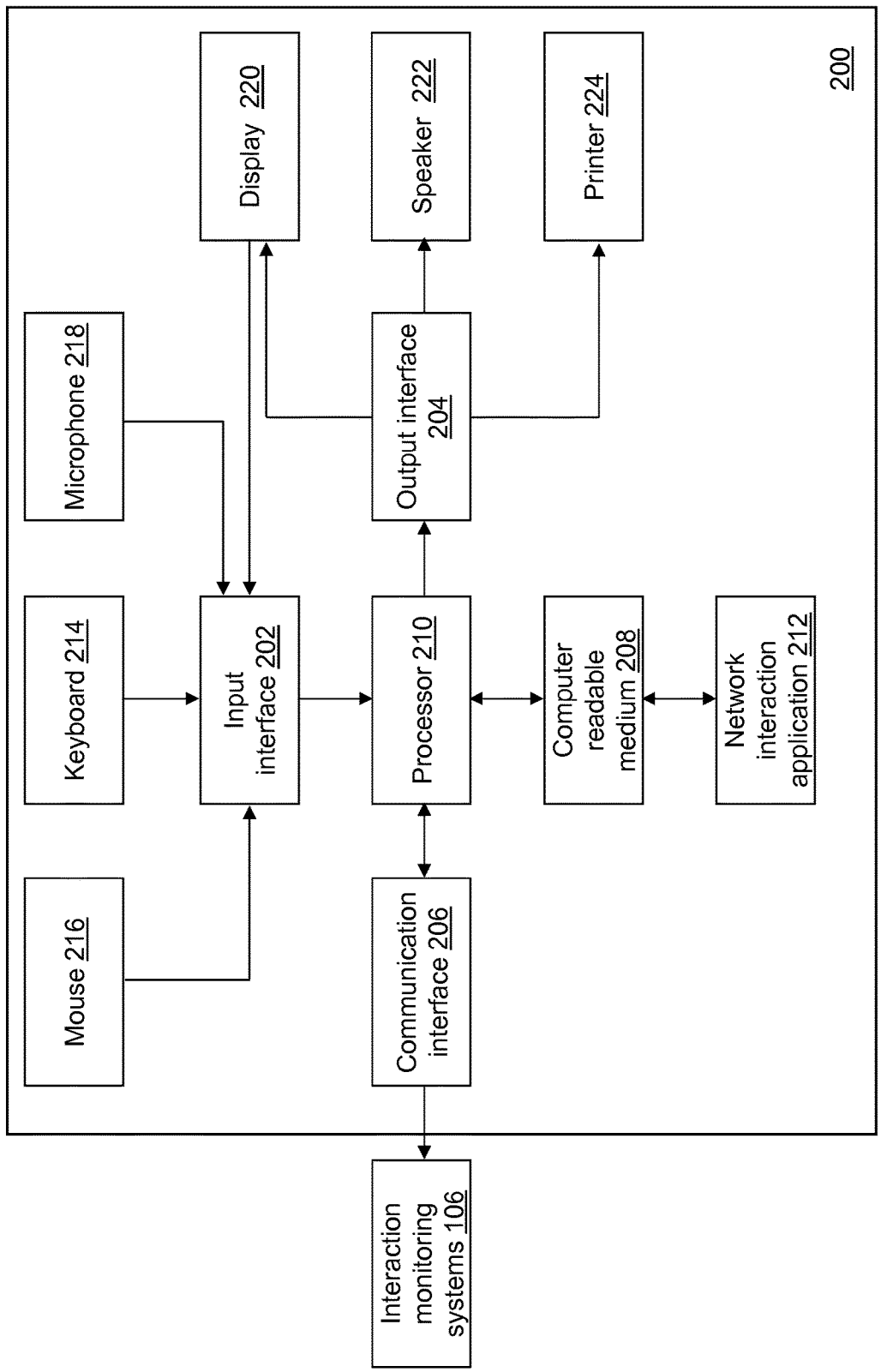
FIG. 2 depicts a block diagram of a network interaction device of the scoring network system of FIG. 1 in accordance with an illustrative embodiment.

Referring to FIG. 2, a block diagram of a network interaction device 200 of the network interaction systems 104 is shown in accordance with an illustrative embodiment. Network interaction device 200 is an example computing device of the network interaction systems 104. Network interaction device 200 may include an input interface 202, an output interface 204, a communication interface 206, a computer-readable medium 208, a processor 210, and a network interaction application 212. Fewer, different, and additional components may be incorporated into network interaction device 200.

Input interface 202 provides an interface for receiving information from the user for entry into network interaction device 200 as understood by those skilled in the art. Input interface 202 may interface with various input technologies including, but not limited to, a keyboard 214, a mouse 216, a microphone 218, a display 220, a track ball, a keypad, one or more buttons, etc. to allow the user to enter information into network interaction device 200 or to make selections presented in a user interface displayed on display 220. The same interface may support both input interface 202 and output interface 204. For example, a touch screen display supports user input and presents output to the user. Network interaction device 200 may have one or more input interfaces that use the same or a different input interface technology. Keyboard 214, mouse 216, microphone 218, display 220, etc. further may be accessible by network interaction device 200 through communication interface 206.

Output interface 204 provides an interface for outputting information for review by a user of network interaction device 200. For example, output interface 204 may interface with various output technologies including, but not limited to, display 220, a speaker 222, a printer 224, etc. Network interaction device 200 may have one or more output interfaces that use the same or a different interface technology. Display 220, speaker 222, printer 224, etc. further may be accessible by network interaction device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Network interaction device 200 may have one or more communication interfaces that use the same or a different communication interface technology. For example, network interaction device 200 may support communication using an Ethernet port, a Bluetooth antenna, a telephone jack, a USB port, etc. Data and messages may be transferred between network interaction device 200 and the interaction monitoring systems 106 using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Network interaction device 200 may have one or more computer-readable media that use the same or a different memory media technology. Network interaction device 200 also may have one or more drives that support the loading of a memory media such as a CD, DVD, an external hard drive, etc. One or more external hard drives further may be connected to network interaction device 200 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Network interaction device 200 may include a plurality of processors that use the same or a different processing technology.

Network interaction application 212 performs operations associated with generating data related to an entity. Network interaction application 212 may be implemented using hardware, firmware, software, or any combination of these methods. Referring to the example embodiment of FIG. 2, network interaction application 212 is implemented in software (comprised of computer-readable and/or computer-executable instructions) stored in computer-readable medium 208 and accessible by processor 210 for execution of the instructions that embody the operations of network interaction application 212. Network interaction application 212 may be written using one or more programming languages, assembly languages, scripting languages, etc.

Network interaction application 212 may be implemented as a Web application. For example, network interaction application 212 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

For illustration, network interaction application 212 may be a browser application that performs operations associated with retrieving, presenting, and traversing information resources provided by a web application and/or web server as known to those skilled in the art. Example browser applications include Firefox® by Mozilla Corporation, Opera by Opera Software Corporation, Internet Explorer® by Microsoft Corporation, Safari by Apple Inc., Chrome by Google Inc., etc. as understood by those skilled in the art.

Network interaction application 212 may send HTTP messages to the interaction monitoring systems 106 using communication interface 206. Browser may be supporting interaction with a social network website, an organization website, a retailer's website, etc. that may be public or private.

Figure 3:
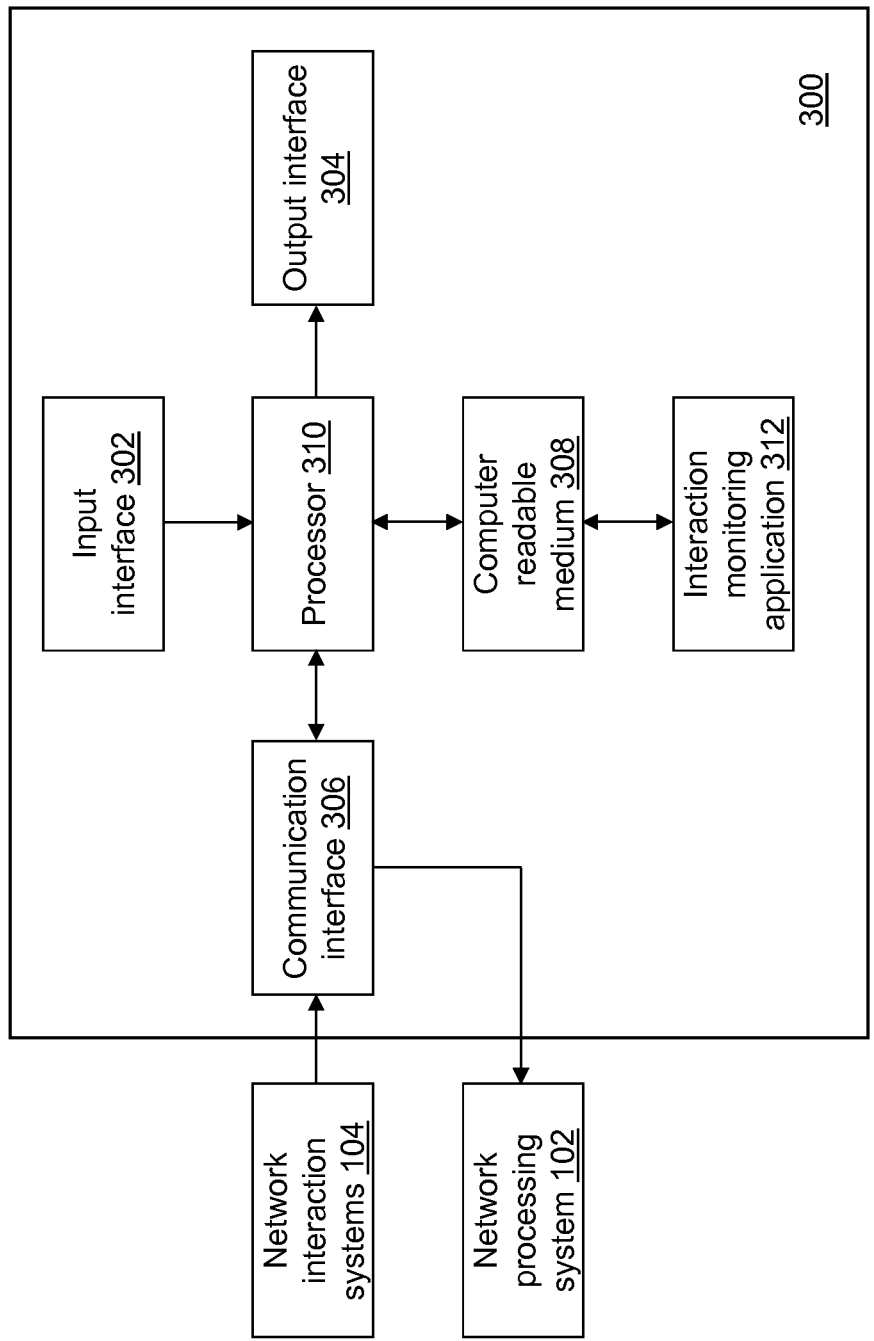
FIG. 3 depicts a block diagram of an interaction monitoring device of the scoring network system of FIG. 1 in accordance with an illustrative embodiment.

Referring to FIG. 3, a block diagram of an interaction monitoring device 300 of the interaction monitoring systems 106 is shown in accordance with an example embodiment. Interaction monitoring device 300 is an example computing device of the interaction monitoring systems 106. Interaction monitoring device 300 may include a second input interface 302, a second output interface 304, a second communication interface 306, a second computer-readable medium 308, and an interaction monitoring application 312. Fewer, different, and additional components may be incorporated into interaction monitoring device 300.

Second input interface 302 provides the same or similar functionality as that described with reference to input interface 202 of network interaction device 200 though referring to interaction monitoring device 300. Second output interface 304 provides the same or similar functionality as that described with reference to output interface 204 of network interaction device 200 though referring to interaction monitoring device 300. Second communication interface 306 provides the same or similar functionality as that described with reference to communication interface 206 of network interaction device 200 though referring to interaction monitoring device 300. Data and messages may be transferred between interaction monitoring device 300 and network processing system 102 and/or the network interaction systems 104 using second communication interface 306. Second computer-readable medium 308 provides the same or similar functionality as that described with reference to computer-readable medium 208 of network interaction device 200 though referring to interaction monitoring device 300. Second processor 312 provides the same or similar functionality as that described with reference to processor 210 of network interaction device 200 though referring to interaction monitoring device 300.

Interaction monitoring application 312 performs operations associated with receiving the data generated by the one or more computing devices of the network interaction systems 104 and calculating a score value that is sent to network processing system 102. Some or all of the operations described herein may be embodied in interaction monitoring application 312. The operations may be implemented using hardware, firmware, software, or any combination of these methods. Referring to the example embodiment of FIG. 3, interaction monitoring application 312 is implemented in software (comprised of computer-readable and/or computer-executable instructions) stored in second computer-readable medium 308 and accessible by second processor 312 for execution of the instructions that embody the operations of interaction monitoring application 312. Interaction monitoring application 312 may be written using one or more programming languages, assembly languages, scripting languages, etc.

Interaction monitoring application 312 may be implemented as a Web application. For example, interaction monitoring application 312 may be configured to receive HTTP responses from other computing devices such as those associated with network interaction systems 104 and/or to send HTTP requests to other computing devices such as those associated with network processing system 102.

Figure 4:
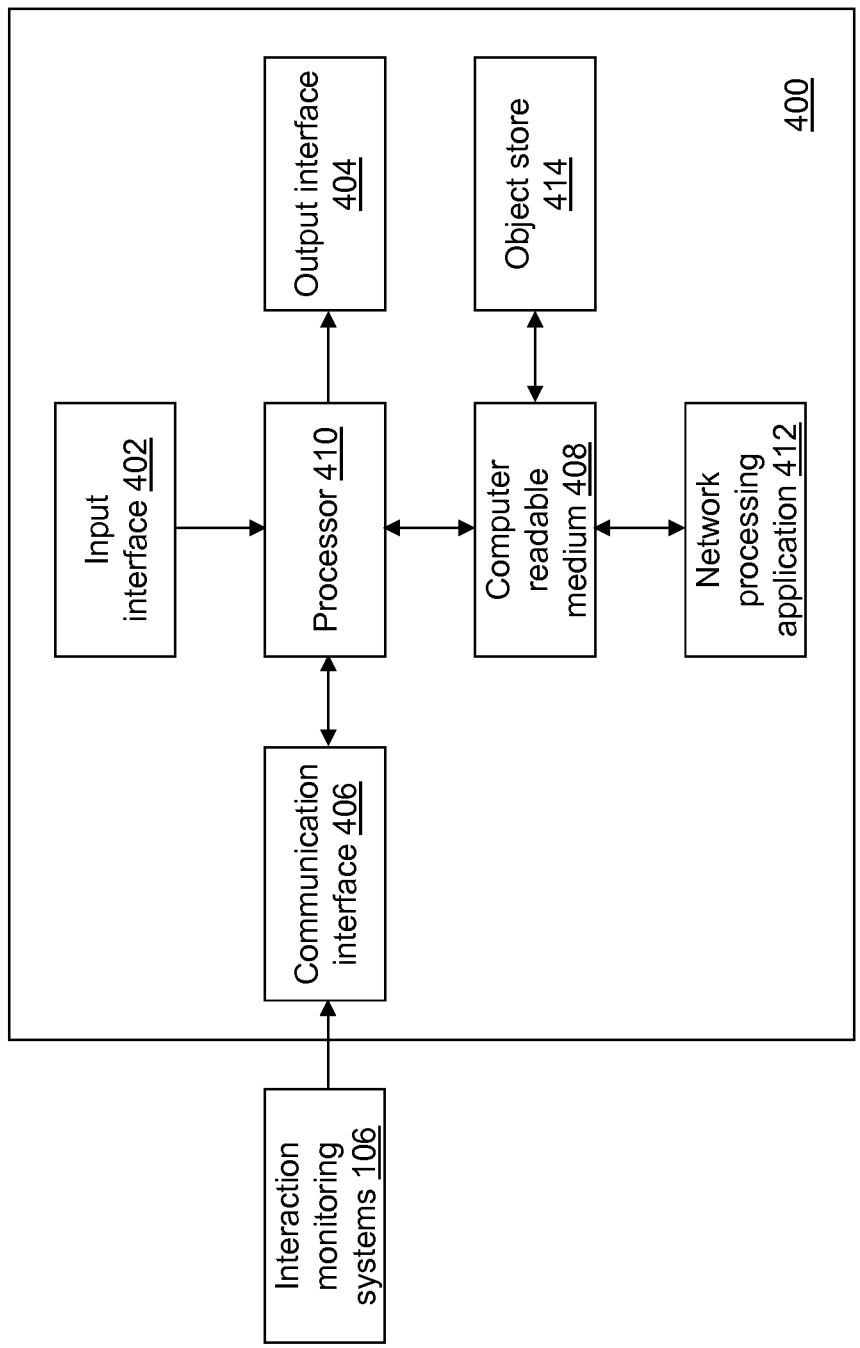
FIG. 4 depicts a block diagram of a network processing device of the scoring network system of FIG. 1 in accordance with an illustrative embodiment.

Referring to FIG. 4, a block diagram of a network processing device 400 of network processing system 102 is shown in accordance with an illustrative embodiment. Network processing device 400 is an example computing device of network processing system 102. Network processing device 400 may include a third input interface 402, a third output interface 404, a third communication interface 406, a third computer-readable medium 408, and a network processing application 412. Fewer, different, and additional components may be incorporated into network processing device 400.

Third input interface 402 provides the same or similar functionality as that described with reference to input interface 202 of network interaction device 200 though referring to network processing device 400. Third output interface 404 provides the same or similar functionality as that described with reference to output interface 204 of network interaction device 200 though referring to network processing device 400. Third communication interface 406 provides the same or similar functionality as that described with reference to communication interface 206 of network interaction device 200 though referring to network processing device 400. Data and messages may be transferred between network processing device 400 and the interaction monitoring systems 106 using third communication interface 406. Third computer-readable medium 408 provides the same or similar functionality as that described with reference to computer-readable medium 208 of network interaction device 200 though referring to network processing device 400. Third processor 410 provides the same or similar functionality as that described with reference to processor 210 of network interaction device 200 though referring to network processing device 400.

Network processing application 412 performs operations associated with receiving the score value and information identifying the node from the interaction monitoring systems 106 and updating a node score and a network score for the node and possibly node and network scores for one or more other nodes in the network of nodes that are linked to the node. Some or all of the operations described herein may be embodied in network processing application 412. The operations may be implemented using hardware, firmware, software, or any combination of these methods. Referring to the example embodiment of FIG. 4, network processing application 412 is implemented in software (comprised of computer-readable and/or computer-executable instructions) stored in third computer-readable medium 408 and accessible by third processor 410 for execution of the instructions that embody the operations of network processing application 412. Network processing application 412 may be written using one or more programming languages, assembly languages, scripting languages, etc.

Network processing application 412 may be implemented as a Web application. For example, network processing application 412 may be configured to accept HTTP requests from client devices such as those associated with the interaction monitoring systems 106.

Network processing device 400 includes or can access object store 414 through a direct connection and/or through network devices 108 using third communication interface 406. Third computer-readable medium 408 may provide the electronic storage medium for object store 414. Object store 414 is a data repository for scoring network system 100. Object store 414 may include a plurality of databases that may be organized into multiple database tiers to improve data management and access. Object store 414 may utilize various database technologies and a variety of formats as understood by those skilled in the art including a file system, a relational database, a system of tables, a structured query language database, etc. Object store 414 may be implemented as a single database or as multiple databases stored in different storage locations distributed over the Internet or other heterogeneous storage infrastructures. Object store 414 further may be implemented as a shared grid of data distributed across network processing system 102.

Network processing application 412 may save or store data to object store 414 and access or retrieve data from object store 414. Network processing device 400 includes or can access object store 414 either through a direct connection or through network devices 108 using third communication interface 406. Third computer-readable medium 408 may provide the electronic storage medium for object store 414. Object store 414 is a data repository for scoring network system 100. Object store 414 may include a plurality of databases that may be organized into multiple database tiers to improve data management and access. Object store 414 may utilize various database technologies and a variety of formats as understood by those skilled in the art including a file system, a relational database, a system of tables, a structured query language database, etc. Object store 414 may be implemented as a single database or as multiple databases stored in different storage locations distributed over the Internet or other heterogeneous storage infrastructures. Object store 414 further may be implemented as a shared grid distributed across network processing system 102 to support parallel processing.

Interaction monitoring application 312, network interaction application 212, and network processing application 412 may be the same or different applications or part of an integrated, distributed application supporting some or all of the same or additional types of functionality as described herein. Various levels of integration between the components of scoring network system 100 may be implemented without limitation as understood by a person of skill in the art.

Figure 5:
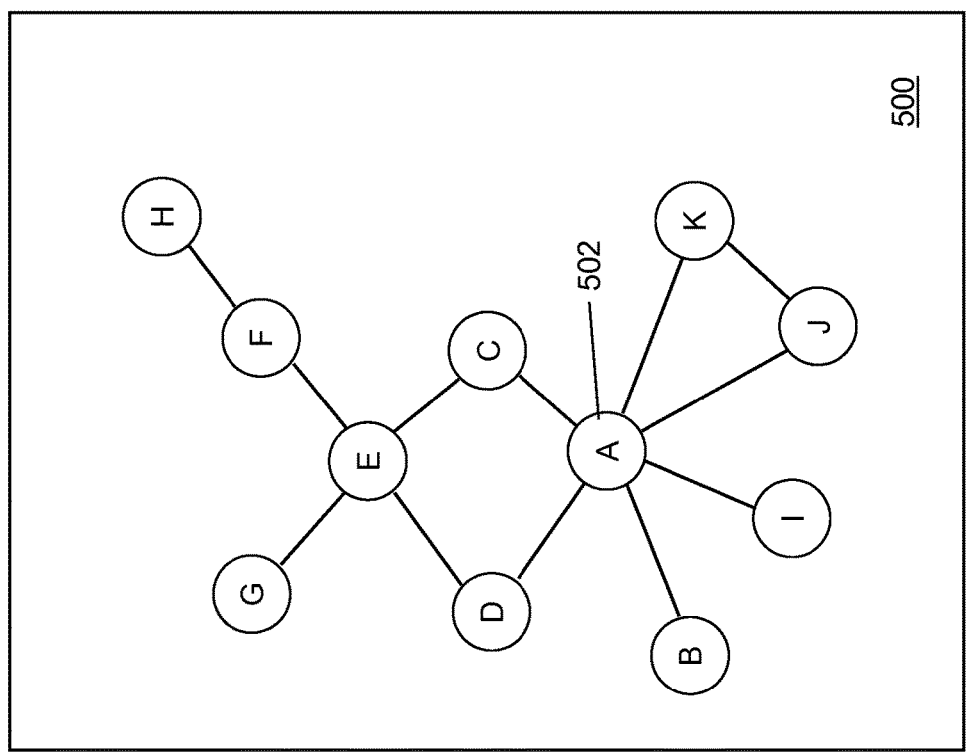
FIG. 5 depicts a node diagram illustrating a first anchored network of the scoring network system of FIG. 1 in accordance with an illustrative embodiment.

Referring to FIG. 5, a first anchored network 500 is shown in accordance with an illustrative embodiment. First anchored network 500 includes a plurality of nodes labeled A, B, C, D, E, F, G, H, I, J, and K. An anchor node 502 of first anchored network 500 is labeled "A". The remaining plurality of nodes labeled B through K may be anchors in their own anchored network. The remaining plurality of nodes labeled B through K are directly or indirectly linked to node A within a maximum degree of separation. For example, the nodes labeled B, C, D, I, J, and K are one degree of separation from node A, and thus, are directly connected to node A. There are two paths from node A to node K: A→J→K and A→K, and two paths from node A to node J: A→K→J and A→J. The node labeled E is two degrees of separation from node A and is connected to node A through the nodes labeled D and C. There are two paths from node A to node E: A→D→E and A→C→E. The nodes labeled G and F are three degrees of separation from node A and are directly connected to node E. There are two paths from node A to node G: A→D→E→G and A→C→E→G, and two paths from node A to node F: A→D→E→F and A→C→E→F. The node labeled H is four degrees of separation from node A and is connected to node A through the node labeled H. There are two paths from node A to node F: A→D→E→F→H and A→C→E→F→H. In the illustrative embodiment, the maximum degree of separation is at least four; otherwise, the node labeled H would not be included in first anchored network 500.

Figure 6:
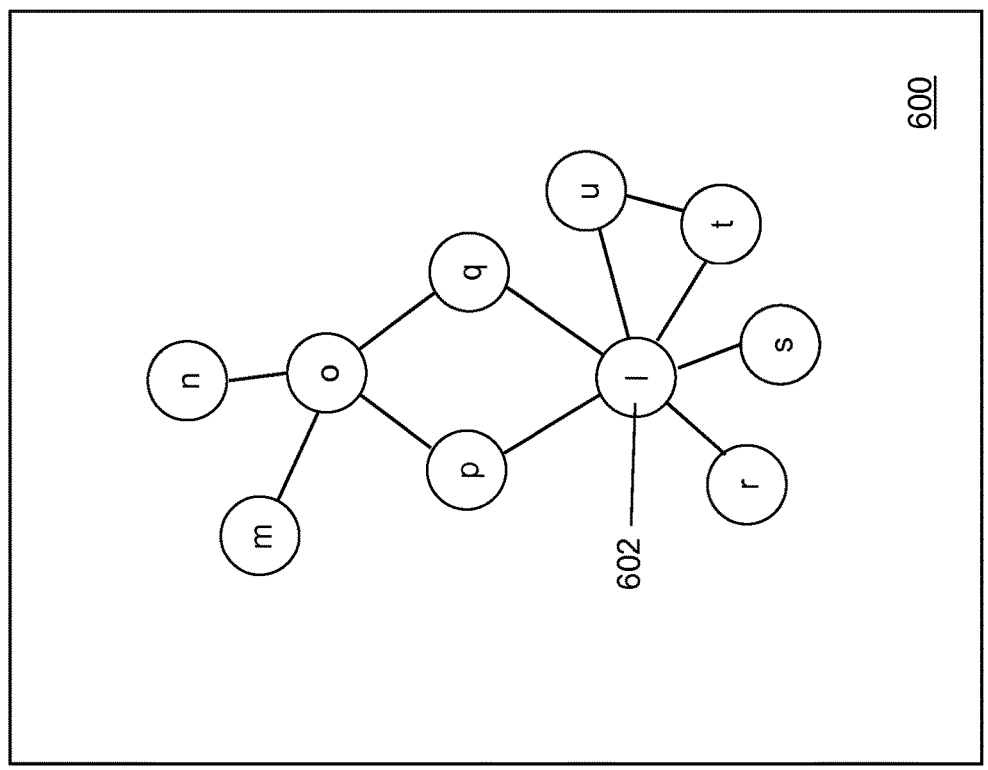
FIG. 6 depicts a node diagram illustrating a second anchored network of the scoring network system of FIG. 1 in accordance with an illustrative embodiment.

Referring to FIG. 6, a second anchored network 600 is shown in accordance with an illustrative embodiment. Second anchored network 600 includes a plurality of nodes labeled l, m, n, o, p, q, r, s, t, and u. An anchor node 602 of second anchored network 600 is labeled "l". The remaining plurality of nodes labeled m through u may be anchors in their own anchored network. The remaining plurality of nodes labeled m through u is directly or indirectly linked to node l within the maximum degree of separation. For example, the nodes labeled p, q, r, s, t, and u are one degree of separation from node l, and thus, are directly connected to node l. There are two paths from node l to node u: l→y→u and l→u, and two paths from node l to node t: l→u→t and l→t. The node labeled o is two degrees of separation from node l and is connected to node l through the nodes labeled p and q. There are two paths from node l to node o: l→p→o and 1→q→o. The nodes labeled m and n are three degrees of separation from node l and are directly connected to node o. There are two paths from node l to node m: 1→p→o→m and 1→q→o→m, and two paths from node l to node n: 1→p→o→n and 1→q→o→n.

There may be any number of nodes in an anchored network. Each node may represent a different entity. An entity may be, for example, different actors (provider, claimant, banker), a transaction, an address, a company, a facility (i.e., hospital, bank, prison, office building), etc. The links between nodes can be different types of links with different weight values that indicate a strength or importance of the connection between the paired nodes.

Figure 7:
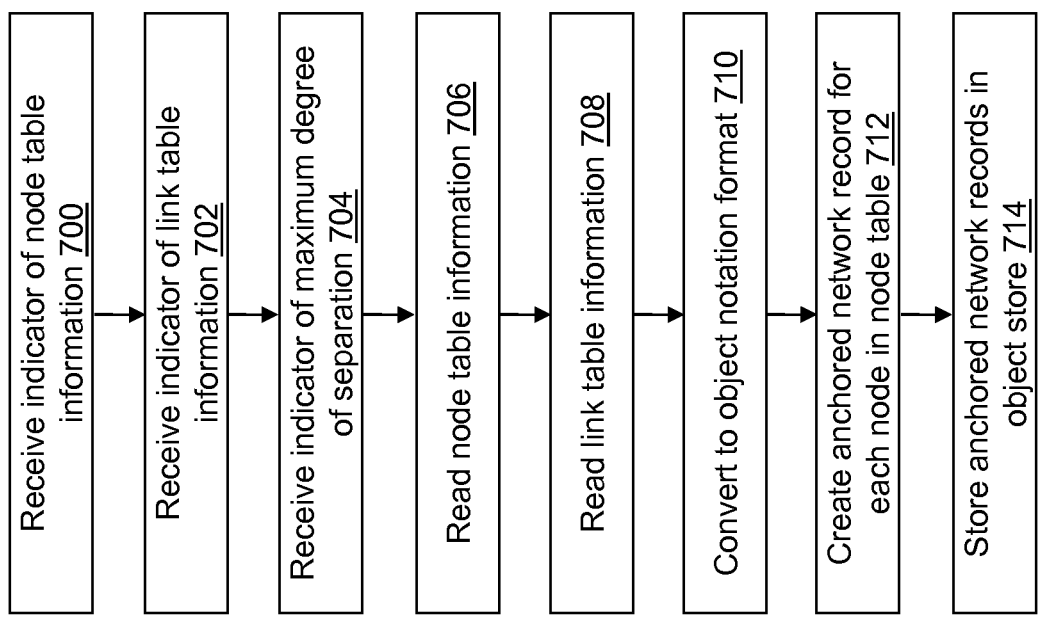
FIG. 7 depicts a flow diagram illustrating examples of operations performed by a network processing system of FIG. 1 in accordance with an illustrative embodiment.

Referring to FIG. 7, example operations associated with network processing application 412 are described. Additional, fewer, or different operations may be performed depending on the embodiment. The order of presentation of the operations of FIG. 7 is not intended to be limiting. Although some of the operational flows are presented in sequence, the various operations may be performed in various repetitions, concurrently (in parallel, for example, using threads), and/or in other orders than those that are illustrated. For example, a user may execute network processing application 412, which causes presentation of a first user interface window, which may include a plurality of menus and selectors such as drop down menus, buttons, text boxes, hyperlinks, etc. associated with network processing application 412 as understood by a person of skill in the art. As used herein, an indicator indicates one or more user selections from a user interface, one or more data entries into a data field of the user interface, one or more data items read from third computer-readable medium 408 or otherwise defined with one or more default values, etc.

In an operation 700, a first indicator of node table information is received. For example, the first indicator indicates a location of the node table information. As an example, the first indicator may be received by network processing application 412 after selection from a user interface window or after entry by a user into a user interface window. In an alternative embodiment, the location of the node table information may not be selectable. For example, a most recently created node table may be used automatically.

In an operation 702, a second indicator of link table information is received. For example, the second indicator indicates a location of the link table information. As an example, the second indicator may be received by network processing application 412 after selection from a user interface window or after entry by a user into a user interface window. In an alternative embodiment, the location of the link table information may not be selectable. For example, a most recently created link table may be used automatically.

In an operation 704, a third indicator of a maximum degree of separation, $DS_{max}$, is received. The third indicator may be received by network processing application 412, for example, after a selection from a user interface window or after entry by a user into a user interface window. A default value for $DS_{max}$ further may be stored in third computer-readable medium 408. In an alternative embodiment, the $DS_{max}$ may not be selectable and the default value is used.

In an operation 706, the node table information is read from the location indicated by the first indicator. In an operation 708, the link table information is read from the location indicated by the second indicator. For example, the node table information and the link table information may include historical network information. The node table information and the link table information may provide a baseline from which nodes can be incrementally updated and scored in real time. In some embodiments, "real time" may refer to the sub-millisecond or sub-second processing and/or scoring of data/networks. In some embodiments, "real time" may be referred to as near-real time processing or low latency processing. In some embodiments, the "real time" aspects may depend on one or more factors, such as hardware, concurrent new data transaction volumes, network sizes and/or capacity, the type(s) of scoring and/or the complexity of scoring, for example. The node table information and the link table information fields and layout may be based on traditional layouts for batch social network analysis. Table I below shows an example of a node table structure:

TABLE I

| Field Label | Description |
| --- | --- |
| uid | A unique identifier for the node. |
| node_type | A type of node for the node. |
| node_label | A label for the node used when displaying the network. |
| node_tooltip | Basic node information presented when the node is selected when displaying the network. |
| node_color | A color used to represent the node when displaying the network. |
| node_degrees | An orientation of the label for the node when displaying the network. |
| border_size | A border size of the label for the node when displaying the network. |
| change_dt | A date and time the node last changed. |
| f1-p | One or more factors associated with the node and used for network scoring the node. |
| node_score | A node score value computed for the node using an analytic model. |
| network_score | A network score value computed for the node and its network. |
| overall_score | An overall score value computed based on the node scores and network scores for the node and its network. |
| node_score_dt | A date and time the node score was last generated. |
| network_score_dt | A date and time the network score was last generated. |

Table II below shows an example of a link table structure:

TABLE II

| Field | Description |
| --- | --- |
| uid_link | A unique identifier for each link between the pair of nodes. |
| from_node_id | A reference to the "from" node uid. |
| to_node_id | A reference to the "to" node uid. |

TABLE II-continued

| Field | Description |
| --- | --- |
| link_type | A type of link for the link. |
| link_color | A color used to represent the link when displaying the network. |
| link_label | A label for the link used when displaying the network. |
| link_width | A width or "strength"of the relationship of the link between the pair of nodes. |
| link_start_dt | A date and time the link was established. |
| link_end_dt | A date and time the link was stopped. |

The network score value, network_score, is computed using a network scoring algorithm. For illustration, a network score value for network_score for the node may be computed as:

$$\left[\sum_{i=1}^{N} \text{node\_score}(i) * \left(\frac{W_1}{\text{degrees}(i)} + W_2 * \text{Avg\_weight}(i)\right)\right]/N,$$

where N is a number of nodes in a network of nodes linked to the node, node_score(i) is a node_score value of the $i^{th}$ node in the network of nodes linked to the node, $W_1$ is a first weight value, degrees(i) is a degree of separation (DOS) of the $i^{th}$ node from the node, $W_2$ is a second weight value, and Avg_weight(i) is an average link width calculated using a link_width for each node in the network of nodes linked to the $i^{th}$ node. $W_1$ and $W_2$ may be defined as inputs. A link_width calculation may be dependent on a type of network. For example, if a link between a pair of nodes is based on phone calls, the link_width could be determined by the number of phone calls (normalized). If a link between a pair of nodes is based on financial transactions, the link_width could be determined by how much cumulative money is wired between two nodes/entities.

As another example, a network score value for network_score for the node may be computed as an average of the node score value, node_score, for each node in the network of nodes linked to the node. Other network score values may be calculated by incorporating node factors f1-p. For illustration, a network score value for network_score for the node may be computed as: $[\sum_{i=1}^{N} W_1*f1+W_2*f2]/N$.

For illustration, an overall score value for overall_score for the node may be computed as: $W_1*\text{node\_score}+W_2*\text{network\_score}$.

In an operation 710, the read node table information and the read link table information are converted to an object notation format. For example, the object notation format may be a JavaScript® object notation (JSON), a binary JSON (BSON) format, etc. Other formats may be used including XML.

In an operation 712, an anchored network record is created for each node in the node table information using the converted node and link table information. Table III below shows an example of an anchored network record structure:

TABLE III

| Field Label | Description |
| --- | --- |
| _id | A unique identifier for the anchored network. |
| anchor_id | A unique identifier of the anchor node. |
| anchor_node_type | A type of node of the anchor node. |
| anchor_node_score | A node score for the anchor node. |
| anchor_node_score_dt | A date and time the anchor node score was last generated. |
| anchor_network_score | A network score for the anchored network of the anchor node. |
| anchor_network_score_dt | A date and time the network score was last generated for the anchor node. |
| anchor_network_type | A type of network of the anchor node. |
| anchor_overall_score | An overall score value computed based on the node scores and network scores for the anchor node and its network. |
| anchor_overall_score_dt | A date and time the overall score was last generated. |
| node: [ ] | An array of node records in the anchored network. |
| link: [ ] | An array of link records in the anchored network. |

Table IV below shows an example of an example node record structure for each node included in the array of node records of the anchored network record:

TABLE IV

| Field Label | Description |
| --- | --- |
| id | A unique identifier for the node across all of the anchored networks. |
| uid | A unique identifier for the node in the anchored network. |
| node_type | A type of the node. |
| node_label | A label for the node used when displaying the network. |
| node_tooltip | Basic node information presented when the node is selected when displaying the network. |
| node_symbol | A symbol for the node used when displaying the network. |
| node_color | A color used to represent the node when displaying the network. |

TABLE IV-continued

| Field Label | Description |
| --- | --- |
| node_degrees | An orientation of the label for the node when displaying the network. |
| border_size | A border size of the label for the node when displaying the network. |
| change_dt | A date and time the node last changed. |
| f1-p | One or more factors associated with the node and used for network scoring the node. |
| node_score | A node score value. |
| network_score | A network score value computed for the node and its network. |
| overall_score | An overall score value computed based on the node scores and network scores for the node and its network. |
| node_score_dt | A date and time the node score was last generated. |
| network_score_dt | A date and time the network score was last generated. |
| DOS | A degree of separation from the anchored node. |
| anchor | Indicator of whether or not the node is the anchor of the anchored network. |
| num_links | A number of links from this node within the anchored network. |
| sum_link_width | A summed link width for all paths between the anchor node and the node that meet the following criteria: <=DOS excluding links to nodes at the same DOS. |
| sum_num_links | A summed number of links for all paths between the anchor node and the node that meet the following criteria: <=DOS excluding links to nodes at the same DOS. |
| min_sum_link_width | A minimum summed link width for a shortest path between the node and the anchor node. |

Table V below shows an example of an example link record structure for each link in the array of link records in the anchored network record:

TABLE V

| Field | Description |
| --- | --- |
| uid_link | A unique identifier for each link between the pair of nodes. |
| from_node_id | A reference to the "from" node uid. |
| to_node_id | A reference to the "to" node uid. |
| link_type | A type of link for the link. |
| link_color | A color used to represent the link when displaying the network. |
| link_label | A label for the link used when displaying the network. |
| link_width | A width or "strength" of the relationship of the link between the pair of nodes. |
| link_start_dt | A date and time the link was established. |
| link_end_dt | A date and time the link was stopped. |

For example, referring to FIG. 5, the anchored network record for the node labeled "A", includes a node record for each of nodes "B" to "H". The anchored network record for the node labeled "A" further includes a link record for each link between any of the nodes of first anchored network record 500. An anchored network record may include a single node record when the node is not linked to other nodes of the network of nodes.

In an operation 714, the created anchored network record for each node in the node table is stored in object store 414. For example, object store 414 includes an anchored network record for each node first anchored network record 500 and each node of second anchored network record 600.

The anchored network records are indexed at multiple levels and are more efficient to query and update than traditional methods that require database joins, which results in performance improvements and low latency network processing. As understood by a person of skill in the art, one or more of the created anchored network records may include a single node.

The anchored network records can relate to numerous types of networks generally referred to as social networks herein. Actions by or a status of the entity associated with each node may be monitored for data aggregation and mining, network propagation modeling, network modeling and sampling, user attribute and behavior analysis, community-maintained resource support, location-based interaction analysis, social sharing and filtering, recommender systems development, link prediction and entity resolution, intelligence, counter-intelligence, law enforcement activities, etc. In the private sector, businesses may use social network analysis to support activities such as customer interaction and analysis, marketing, and business intelligence needs. Some public sector uses include development of leader engagement strategies, analysis of individual and group engagement and media use, community-based problem solving, clandestine or covert organization mapping and tracking, etc.

For example, in a criminal justice system, law enforcement personnel may identify a risk factor (score) based on the most recent information available to them. Application areas include case work support, supervision of parolees, assessment of risk during routine activities like traffic stops, assessment of a risk of recidivism, etc. As examples, network nodes may be associated with suspects, witnesses, license plates/vehicles, law enforcement personnel, addresses, phone numbers, family members, jails/prisons, employers, etc. As examples, network link data may include links by common address, common phone number, time spent in jail/prison, license registration, witnesses on an arrest, etc. Factors for scoring/estimating the risk of a suspect or parolee may include hours since last offense, number of convicted felonies, number of charged felonies, median severity of crimes, time left on parole, types of programs or treatments the individual has completed, etc.

As another example, in the health care area, health care carriers balance expediting claim payment to providers with a need to perform enough due diligence to detect fraud prior to payment. As examples, network nodes may include providers, hospitals, clinics, patients, claims, pharmacies, etc. As examples, network link data may include links by common address, common phone number, claims, prescriptions, etc. There are many different types of analytic models for health care fraud based on the type of fraud being targeted. For example, the factors for doctor shopping fraud might include number/percentage of pain medications prescribed over a specific period, number/percentage of hallucinogenic medications prescribed for a specific period, a proportion of patients prescribed that saw another physician in the last two weeks without pain or hallucinogenic medications prescribed, a geographic distance between patient address and physician, past claim denials and investigation outcomes for physician and patients, etc.

As another example, in the child welfare area, having a holistic view of children and providers in the foster system can alert case workers to anomalies and to help support decisions that result in better outcomes such as child placement permanency. As examples, network nodes might include children in the system, siblings and other family members, providers, current and existing foster family members, case workers, orphanages, schools, etc. As examples, network link data might include links by family relationships, providers by claims or placement paperwork, case workers, addresses, phone numbers, etc. Factors for estimating the risk of a provider or a child might be a number of foster siblings, a type of housing, a provider role, a provider sex offender flag, a provider criminal history, a sibling criminal history, a geographical location, child demographics and characteristics, etc.

As another example, in the customer churn reduction area, understanding and estimating customer churn (or loss of customers) is important to customer relationship management, pricing, and marketing for businesses. Churn is common in many industries including telecommunications. For example, estimating the likelihood of churn and identifying influencers enables a telecommunications business to target marketing to the appropriate customers to maximize their return from marketing efforts. As examples, network nodes might include customers, phone numbers, addresses, family members, employers, etc. As examples, network link data might include phone calls made, addresses, family members contracted with the telecommunications business, employers, etc. Factors for estimating customer churn might include current monthly phone usage, average length of call, weekend phone usage, percent of calls to people in network, average monthly invoice, a geographical area, demographic information, immediate family information, etc.

Analytic models may be created and used for the various application areas. For example, an analytic model may be developed by studying a relationship between the various factors and a likelihood of an occurrence associated with the application area as understood by a person of skill in the art. An analytical model is typically any closed form mathematical model that estimates the likelihood of an outcome or prescribed action. The analytic models may be used to generate a new or updated score value using a parameter value for one or more factors associated with the analytic model.

Figure 8:
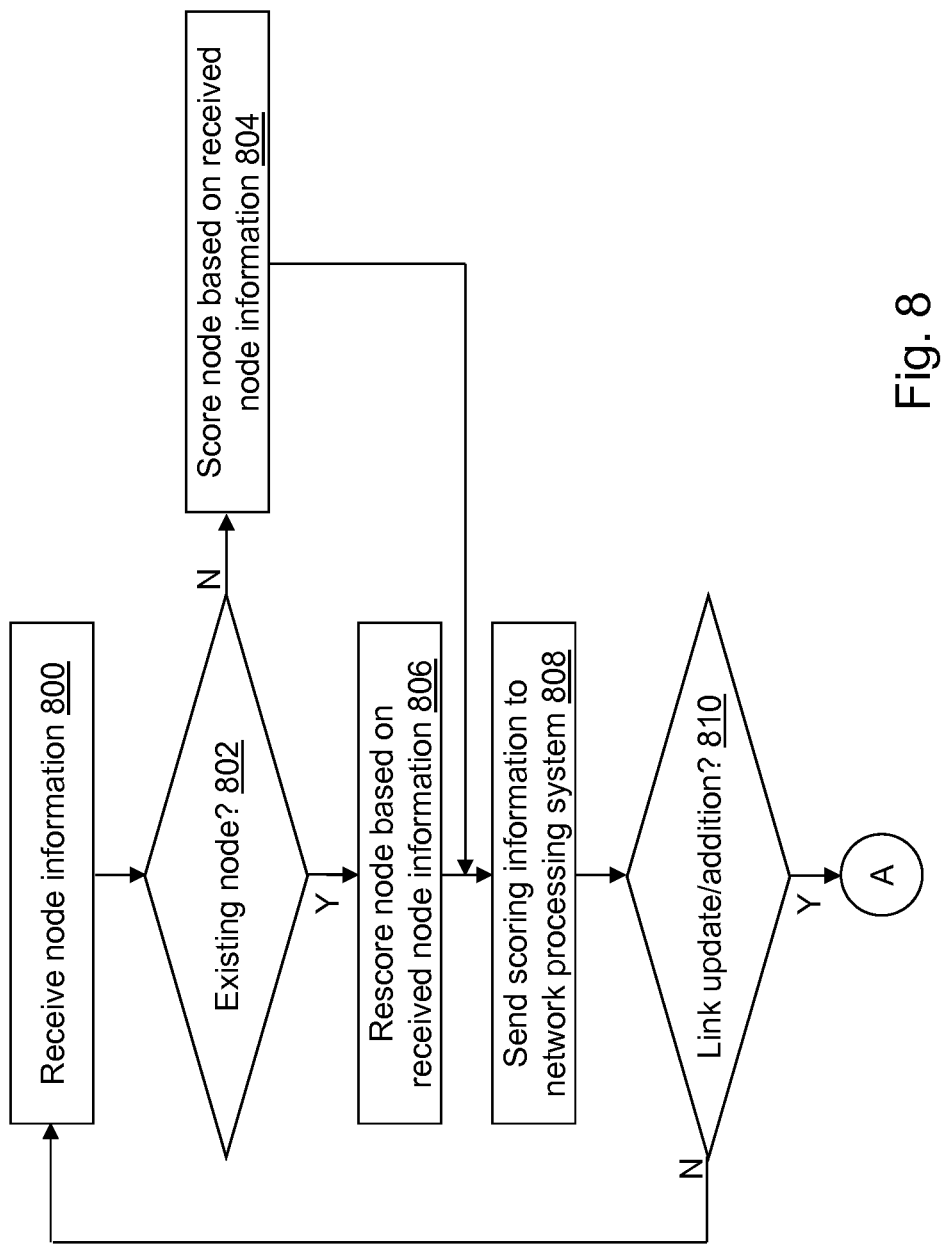
FIGS. 8 and 9 depict flow diagrams illustrating examples of operations performed by interaction monitoring systems of FIG. 1 in accordance with an illustrative embodiment.

Referring to FIG. 8, example operations associated with interaction monitoring application 312 are described. Additional, fewer, or different operations may be performed depending on the embodiment. The order of presentation of the operations of FIG. 8 is not intended to be limiting. Although some of the operational flows are presented in sequence, the various operations may be performed in various repetitions, concurrently (in parallel, for example, using threads), and/or in other orders than those that are illustrated. For example, a user may execute interaction monitoring application 312, which causes presentation of a first user interface window, which may include a plurality of menus and selectors such as drop down menus, buttons, text boxes, hyperlinks, etc. associated with interaction monitoring application 312 as understood by a person of skill in the art. As used herein, an indicator indicates one or more user selections from a user interface, one or more data entries into a data field of the user interface, one or more data items read from second computer-readable medium 308 or otherwise defined with one or more default values, etc.

In an operation 800, node information is received, for example, from network interaction device 200. The received node information may include one or more values related to factors used by interaction monitoring application 312 in computing a score value for a node (e.g., node_score). The received node information further may include node identifier information used to identify the node. For example, the node identifier information may be an entity name, an address, a phone number, entity identifier, etc.

In an operation 802, a determination is made concerning whether or not the node exists. For example, a node exists if node information has been received previously that relates to the node. If the node does not exist, processing continues in an operation 804. If the node exists, processing continues in operation 806. In operation 804, a node score value is computed for the node based on the received node information and processing continues in an operation 808. In operation 806, the node score value for the node is updated for the node based on the received node information and processing continues in operation 808.

In operation 808, the computed node score value and/or other scoring information is sent to network processing system 102, for example, to network processing device 400. For example, a one-way call may be made to network processing device 400. The form of the one-way call may be different dependent on whether or not the entity exists or not. In an alternative embodiment, a message may be sent to network processing device 400. The information sent to network processing device 400 may include node attributes including the computed node score value, network attributes for sub-setting which networks are scored, network scoring information that may include an algorithm indicator, a network scoring indicator, a unique identifier of interaction monitoring device 300, weights associated with a network scoring algorithm, etc.

The algorithm indicator identifies the network scoring algorithm to use to score the network that includes the node. For example, the algorithm indicator indicates a name of a network scoring algorithm from one or more network scoring algorithms registered in network processing system 102 as understood by a person of skill in the art. For example, a user may write MapReduce code for the network scoring algorithm and register it in object store 414 as understood by a person of skill in the art. The algorithm indicator can be passed in through the one-way call to indicate the network scoring algorithm used for scoring. In an alternative embodiment, the network scoring algorithm may not be selectable. A default value for the network scoring algorithm may be stored, for example, in third computer-readable medium 408 and used automatically.

The network scoring indicator identifies one or more network to score. For example, the network scoring indicator may include a list of "id" values for nodes whose anchored network is to be scored. As another example, the network scoring indicator may indicate that all networks that include a listed node "id" value are scored. The networks to score can be identified by a value associated with any field in the node record structure, the link record structure, or the anchored network record structure.

The unique identifier of interaction monitoring device 300 supports parallel processing by network processing system 102. For example, a specific network processing device 400 may be allocated to support scoring updates from a specific interaction monitoring device 300 based on the unique identifier of interaction monitoring device 300. For illustration, the weights associated with the network scoring algorithm may include values for $W_1$ and $W_2$.

In an operation 810, a determination is made concerning whether or not a link is new or updated. For example, the node information may indicate that a new link is created for the node or is updated. If the link is new or updated, processing continues in an operation 900 with reference to FIG. 9. If the link is not new or updated, processing continues in operation 800 to process the next node information that is received.

Figure 9:
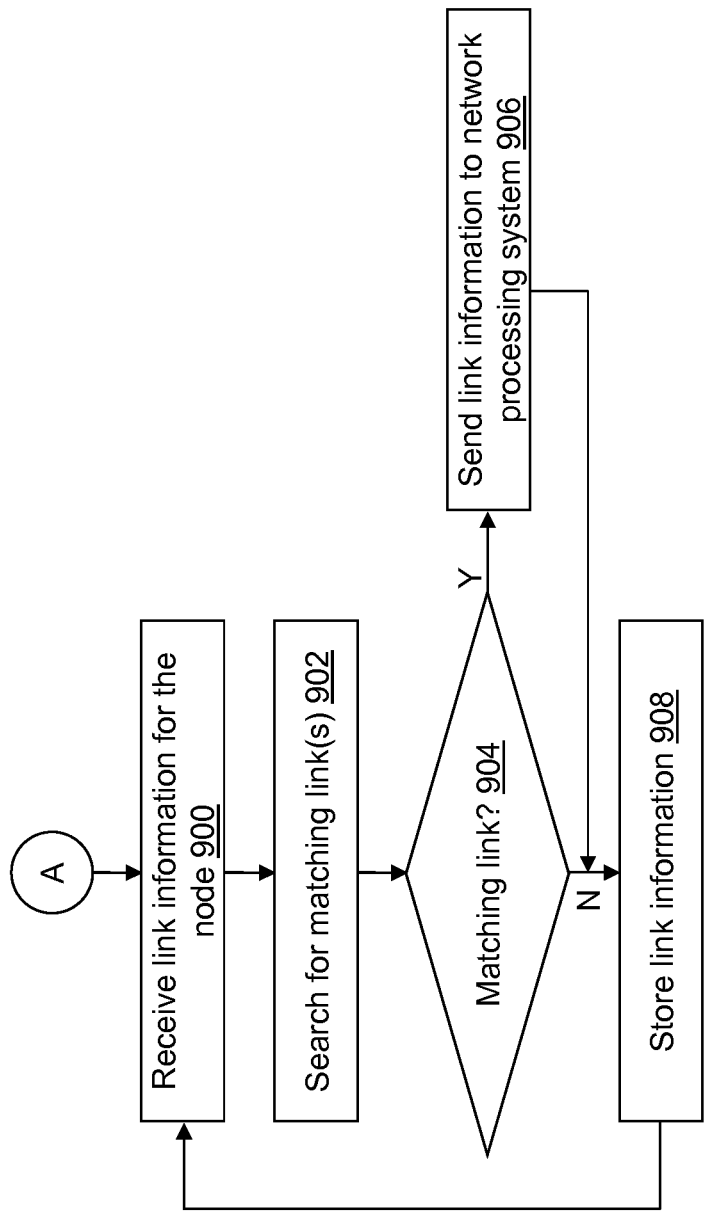

Referring to FIG. 9, additional example operations associated with interaction monitoring application 312 are described. Additional, fewer, or different operations may be performed depending on the embodiment. The order of presentation of the operations of FIG. 9 is not intended to be limiting. Although some of the operational flows are presented in sequence, the various operations may be performed in various repetitions, concurrently (in parallel, for example, using threads), and/or in other orders than those that are illustrated.

In an operation 900, link information for the node is received, for example, from network interaction device 200 or from a different interaction monitoring device 300. The received link information may include the node identifier information, a link type indicator, a linkage data class indicator, a link value, and a standardized link value. The node identifier information may include the unique identifier defined for the node across all of the anchored networks. The link type indicator may be an optional classifier used to define link subsets that are distributed to different interaction monitoring device 300 for processing links in parallel. The linkage data class indicator may indicate a type of linkage information such as address, organization name, etc. The link value is an unstandardized value for the link. The standardized link value is a standardized value for the link. For example, standardized link value may be computed from the link value to support probabilistic matching/match codes as understood by a person of skill in the art.

In operation 902, a search for a matching link is conducted. For example, a link matrix may be searched using the link value and/or the standardized link value based on the linkage data class indicator. For illustration, Table VI below shows an example of a link matrix:

TABLE VI

| node uid | link_type | link_data_class | link_value | link_value_std |
|---|---|---|---|---|
| B1000 | B2B | Address | 7900 S | I·00$3BY4$$$$$$ |
| B1000 | E2B | Business Name·90 | LYNCH Associates | WPJ2$$$$$$$$$$$ |
| B1002 | B2B | Address | 800 E 55TH ST | D00$$55$$$$$$$$ |
| B1002 | B2B | Address | 800 E HYDE PARK | D00$$2~NY$$$$$$ |
| B1002 | E2B | Business Name·90 | BISHOP Corp | 3YN$$$$$$M42N$$ |
| B1003 | B2B | Address | 800 N GREENVIEW | D00$$FYPV$$$$$$ |
| B1003 | E2B | Business Name·90 | CARR, Inc, | 3Y$$$$$$$7P3$$$ |
| B1003 | E2B | Business Name·90 | SALAZAR, LLC. | 4W4Y$$$$$W3$$$$ |
| B1003 | E2B | Business Name·90 | AUSTIN Associates | &4~P$$$$$$$$$$$ |
| B1004 | E2B | Business Name·90 | MENDEZ Corp | 3YN$$$$$$BP84$$ |
| B1005 | E2B | Business Name·90 | GILBERT, Inc. | FWMY~$$$$7P3$$$ |
| B1005 | E2B | Business Name·90 | JENSEN, LLC. | CP4P$$$$$W3$$$$ |
| B101 | B2B | Address | 1 W RIVERWALK S | Z$$$$YVYL$$$$$$ |
| B101 | B2B | Address | 800 N MASSASOIT | D00$$B44~$$$$$$ |
| B101 | B2B | Address | 800 S BISHOP ST | D00$$M42N$$$$$$ |
| B101 | C2B | Business Name·90 | ALVAREZ, LLC. | &WVY4$$$$W3$$$$ |
| B101 | C2B | Business Name·90 | WOODS Associates | L84$$$$$$$$$$$$ |

In an operation 904, a determination is made concerning whether or not a matching link was found in the search. If a matching link was found, processing continues in an operation 906. If a matching link was not found, processing continues in operation 908 to process next node information that is received. For example, if linkage data class indicator is indicated as an address, and the link value is "800 S Bishop St Acme, N.C.", a linking match is found to a node B101.

Figure 10:
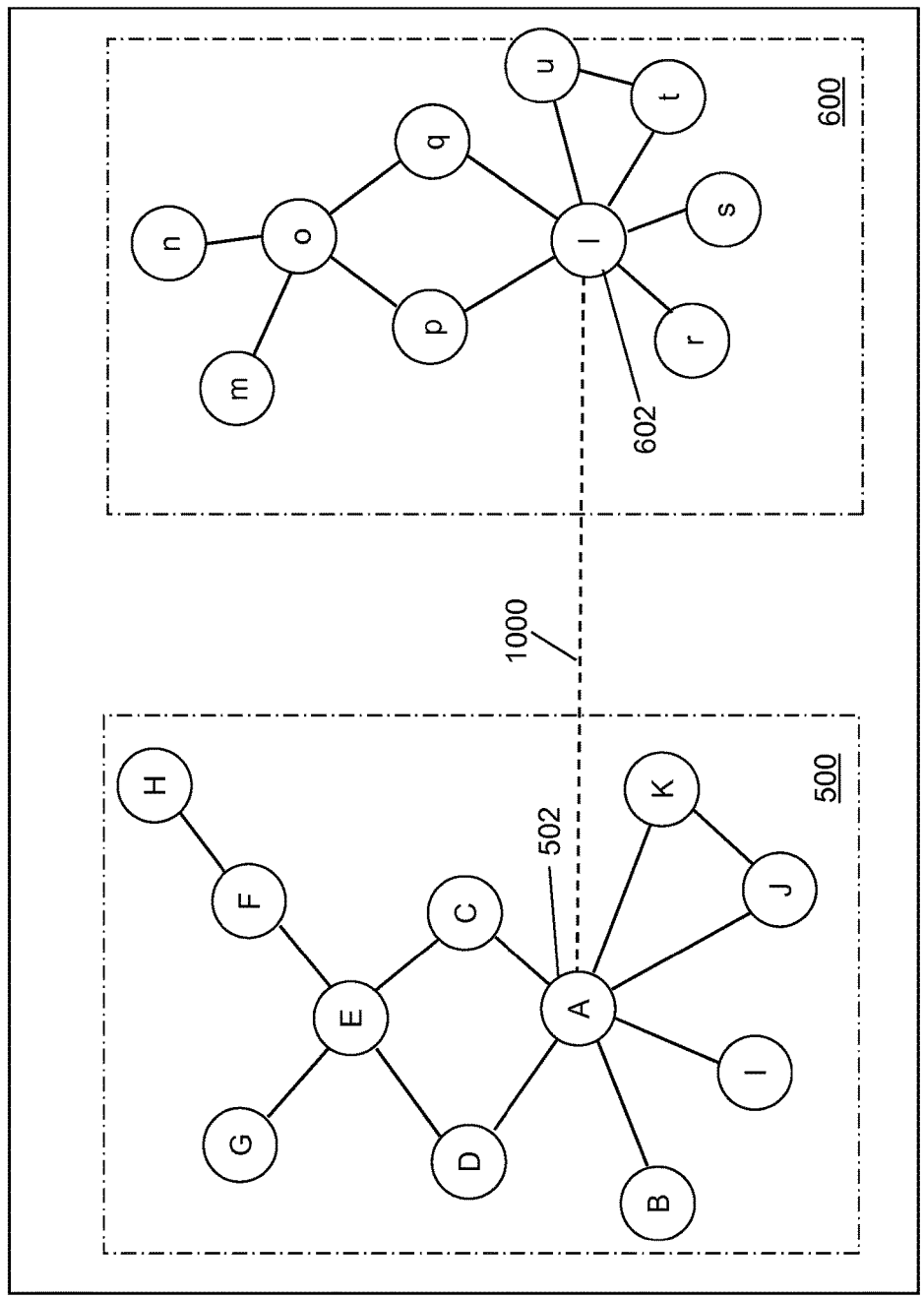
FIG. 10 depicts the linked first anchored network of FIG. 5 and second anchored network of FIG. 6 in accordance with an illustrative embodiment.

For example, referring to FIG. 10, first anchored network 500 and second anchored network 600 are shown with a new link 1000 defined based on identifying a link match between the node labeled "A" and the node labeled "I".

Referring again to FIG. 9, in operation 906, the link information and the node identifier of the node B101 are sent to network processing system 102, for example, to network processing device 400. Processing continues in operation 908.

In operation 908, the link information is stored, for example, in the link matrix for future search operations. Processing continues in operation 900 to process the next link information that is received.

Operations 900 to 908 may be performed by the same or a different interaction monitoring device 300 than the interaction monitoring device 300 that performs operations 800 to 810.

Figure 11:
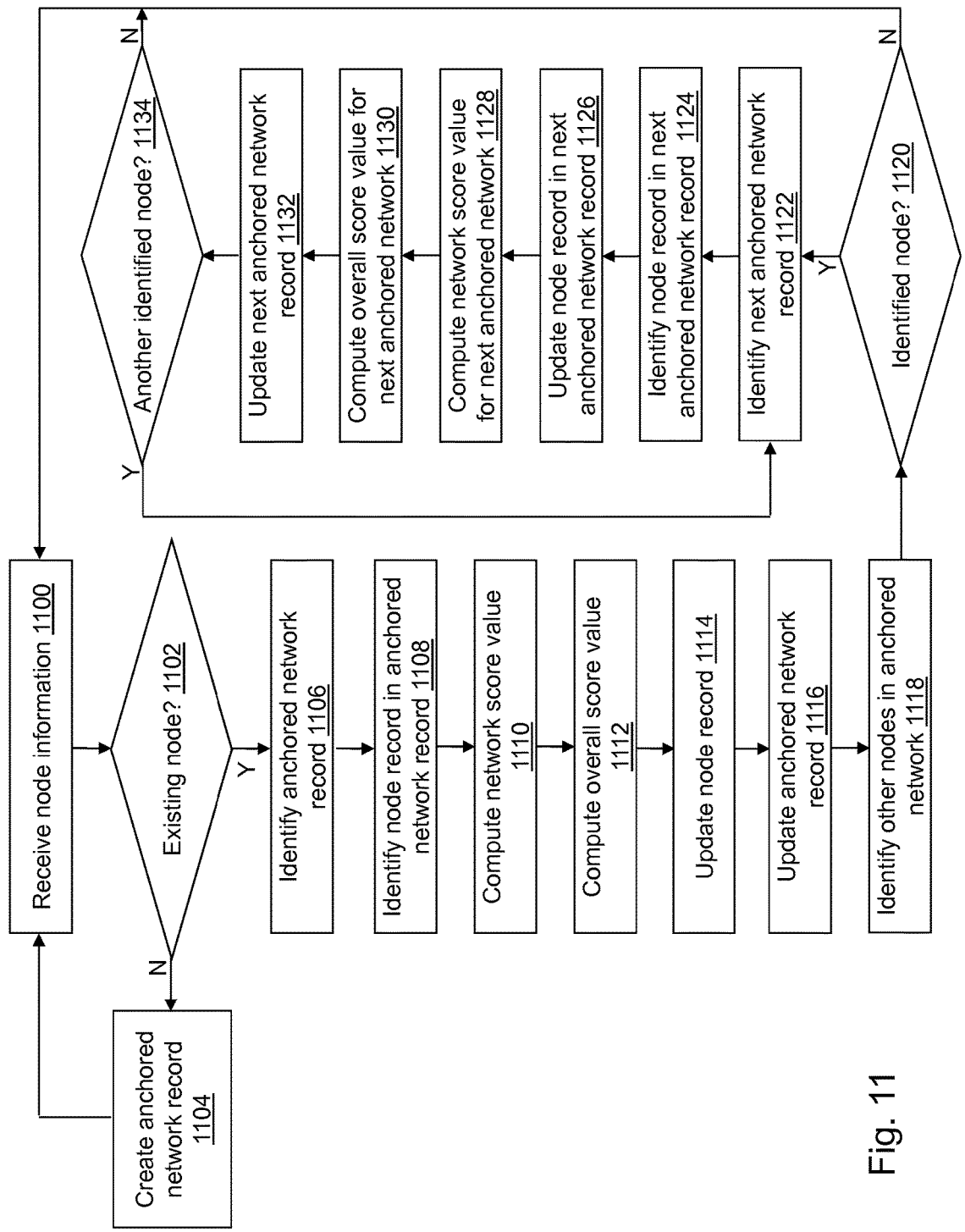
FIGS. 11 to 13 depict flow diagrams illustrating additional examples of operations performed by the network processing system of FIG. 1 in accordance with an illustrative embodiment.

Referring to FIG. 11, additional example operations associated with network processing application 312 are described. Additional, fewer, or different operations may be performed depending on the embodiment. The order of presentation of the operations of FIG. 11 is not intended to be limiting. Although some of the operational flows are presented in sequence, the various operations may be performed in various repetitions, concurrently (in parallel, for example, using threads), and/or in other orders than those that are illustrated.

In an operation 1100, the node information sent in operation 808 is received, for example, from interaction monitoring device 300.

Similar to operation 802, in an operation 1102, a determination is made concerning whether or not the node exists. For example, a node exists if node information has been received previously that relates to the node. If the node does not exist, processing continues in an operation 1104. If the node exists, processing continues in operation 1106. In operation 1104, an anchored network record is created for the new node and processing continues in operation 1100 to process the next node information that is received.

In operation 1106, an anchored network record is identified for the node based on the node identifier information that includes the unique identifier defined for the node across all of the anchored networks. For example, the unique identifier defined for the node is compared to the value of anchor id for each of the anchored network records stored in object store 414 to identify the anchored network record.

In an operation 1108, a node record within the identified anchored network record is identified for the node. For example, the unique identifier defined for the node is compared to the value of uid for each node of the identified anchored network record to identify the node record.

In an operation 1110, a network score value is computed, for example, using the network scoring algorithm indicated by the algorithm indicator and the weights received from interaction monitoring device 300. In an operation 1112, an overall score value is computed using the computed node score value and the computed network score value.

In an operation 1114, the node record of the anchored network record is updated. For example, a value of each of node_score, node_score_dt, network_score, network_score_dt, network_type, overall_score, overall_score_dt are updated for the identified node record within the identified anchored network record.

In an operation 1116, the anchored network record is updated. For example, a value of each of anchor_node_score, anchor_node_score_dt, anchor_network_score, anchor_network_score_dt, anchor_overall_score, and anchor_overall_score_dt are updated for the identified anchored network record.

In an operation 1118, other nodes in the anchored networks are identified for update, for example, based on a value of the network scoring indicator received from interaction monitoring device 300. For example, if the network scoring indicator indicates that all networks that include the node currently being processed are rescored, the identified nodes are those included in the array of node records in the identified anchored network record excluding the anchor node record that is updated in operation 1114.

In an operation 1120, a determination is made concerning whether or not one or more nodes are identified for update. For example, when an anchored network record for the node labeled "A" in first anchored network 500 is updated, each anchored network record of the nodes labeled "B" to "K" includes the node labeled "A" and may be identified as the one or more nodes for update. If at least one node is not identified for update, processing continues in operation 1100 to process the next node information that is received. If at least one node is identified for update, processing continues in an operation 1122.

A first node of the one or more nodes is selected for update. For example, the node labeled "B" may be selected first.

Similar to operation 1106, in operation 1122, a next anchored network record is identified for the selected first node based on a value of id included in the array of node records in the identified anchored network record. For example, the anchored network record for the node labeled "B" is identified as the next anchored network record. Similar to operation 1108, in an operation 1124, a node record within the identified next anchored network record is identified. For example, the node record for the node labeled "A" within the anchored network record for the node labeled "B" is identified.

In an operation 1126, the identified node record is updated in the identified next anchored network record. For example, the node record for the node labeled "A" within the anchored network record for the node labeled "B" is updated as in operation 1114.

Similar to operation 1112, in an operation 1128, a network score value is computed for the identified next anchored network record. Similar to operation 1114, in an operation 1130, an overall score value is computed for the identified next anchored network record. Similar to operation 1116, in an operation 1132, the identified next anchored network record is updated with the computed network score value and the computed overall score value. For example, a value of each of anchor_network_score, anchor_network_score_dt, anchor_overall_score, and anchor_overall_score_dt are updated within the anchored network record for the node labeled "B".

In an operation 1134, a determination is made concerning whether or not there is another node of the one or more nodes to process. If there is not another node to process, processing continues in operation 1100 to process the next node information that is received. If there is another node to process, processing continues in operation 1122 to process a next node of the one or more nodes selected as the first node. For example, the node labeled "C" may be selected in a next iteration of operations 1122 to 1132, the node labeled "D" may be selected after the node labeled "C" and so on as understood by a person of skill in the art.

Figure 12:

Referring to FIG. 12, additional example operations associated with network processing application 312 are described. Additional, fewer, or different operations may be performed depending on the embodiment. The order of presentation of the operations of FIG. 12 is not intended to be limiting. Although some of the operational flows are presented in sequence, the various operations may be performed in various repetitions, concurrently (in parallel, for example, using threads), and/or in other orders than those that are illustrated.

In an operation 1200, the link information sent in operation 906 is received, for example, from interaction monitoring device 300. The link information includes a first node identifier, a second node identifier, and a link width value, new_link_width. Referring to FIG. 10 as an example, for $DS_{max}=4$ and new link 1000, the first node identifier identifies the node labeled "A" and the second node identifier identifies the node labeled "I" and a strength of the connection between the node labeled "A" and the node labeled "I" new_link_width.

Figure 14:
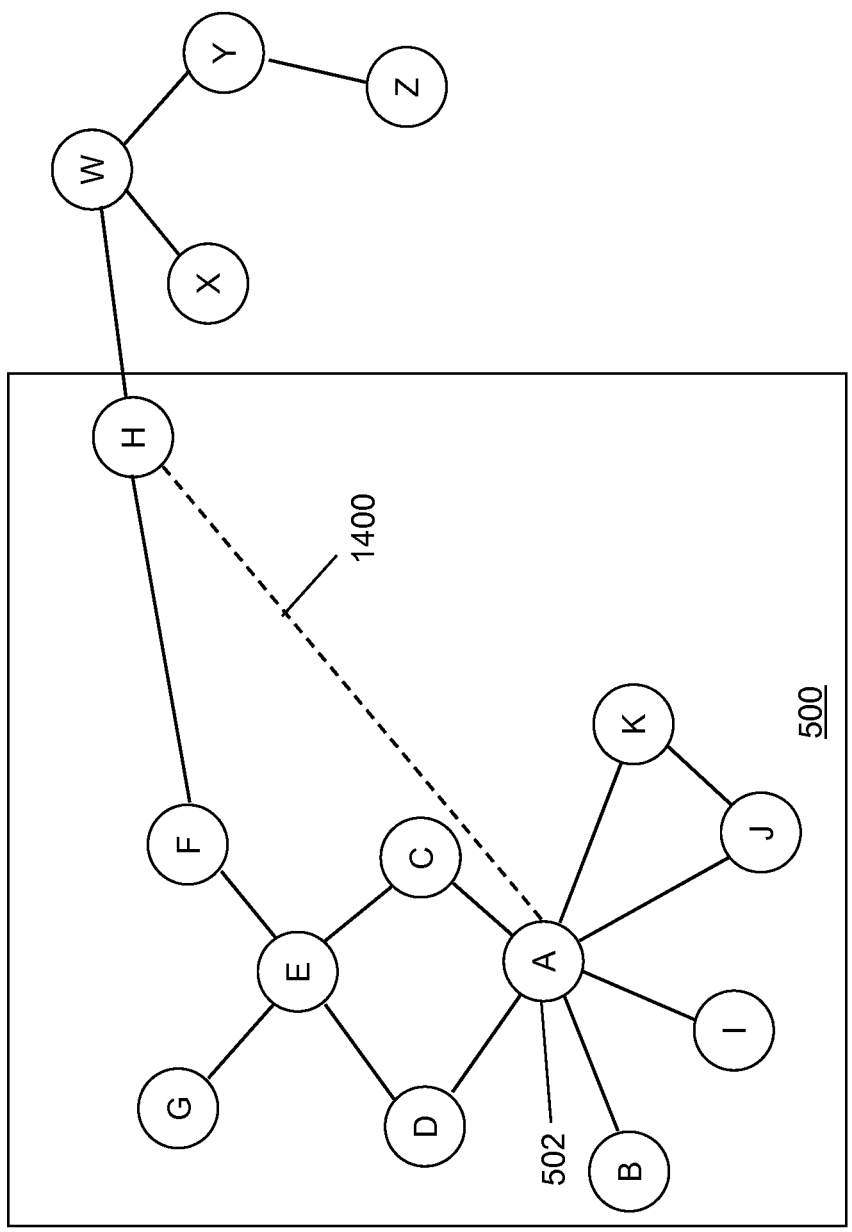
FIG. 14 depicts the linked first anchored network of FIG. 5 and additional nodes identified for a new linkage in accordance with an illustrative embodiment.

In operation 1202, nodes to which new nodes are added are identified. For example, the nodes with a $DOS<DS_{max}$ in the anchored network record of the first node identifier and in the anchored network record of the second node identifier are identified. Referring to FIG. 10 as an example, for $DS_{max}=4$ and new link 1000, the nodes in first anchored network 500 except the node labeled "H" and the nodes in second anchored network 600 are identified. Referring to FIG. 14, as another example, for $DS_{max}=4$ and second new link 1400, the nodes in first anchored network 500 and the nodes labeled W, X, Y, and Z that are connected to the node labeled "H" are identified. New link 1000 may be denoted a between network link addition because the nodes labeled "A" and "I" were not previously connected within $DS_{max}$. Second new link 1400 may be denoted a within network link addition because the nodes labeled "A" and "H" were previously connected within $DS_{max}$.

Figure 13:
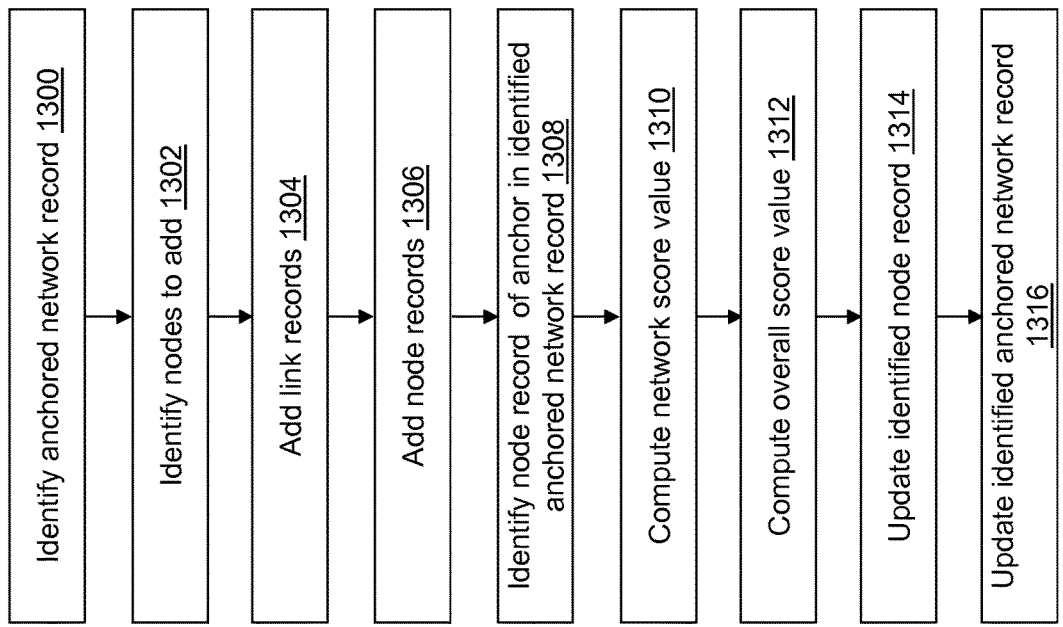

Referring again to FIG. 12, in operation 1204, the anchored network record of each of the nodes identified in operation 1202 is updated. For example, FIG. 13 illustrates operations for updating the anchored network record of each of the nodes identified in operation 1202.

Similar to operation 1106, in an operation 1300, an anchored network record for a current anchor node is identified in object store 414.

In an operation 1302, nodes to add to the anchored network record of the current anchor node are identified. A formula for determining which nodes and links to add to an anchored network for a between network link addition is $DS_{distance}=DS_{max}-(DOS_{ca \rightarrow ll}+1)$, where $DOS_{ca \rightarrow ll}$ is the DOS between $C_a$ and $L_l$, where $C_a$ is the current anchor node, and $L_l$ is the node associated with the first node identifier when the current anchor node was previously in the anchored network of the node associated with the first node identifier, and $L_l$ is the node associated with the second node identifier when the current anchor node was previously in the anchored network of the node associated with the second node identifier. For example, referring to FIG. 10, for $DS_{max}=4$, new link 1000, and $C_a$ as the node labeled "o", $DS_{distance}=4-(2+1)=1$, where $L_l$ is the node labeled "I" and $DOS_{ca \rightarrow ll}=2$ because the node labeled "o" is 2 degrees of separation from the node labeled "I". For $DS_{distance}=1$, the nodes in first anchored network 500 added to the anchored network record for the node labeled "o" are those that have a DOS value of ≤1. Based on this, nodes A, B, C, D, I, J, and K are added to the anchored network record for the node labeled "o".

Referring again to FIG. 13, in an operation 1304, link records are added to the anchored network record for each of the nodes identified in operation 1302.

In an operation 1304, node records are added to the anchored network record for each of the nodes identified in operation 1302. For a between network link addition, values for the parameters of the added node records may be computed as:

$DOS=DOS_{ca \rightarrow ll}+1+DOS$ between $C_n$ and $L_f$;

num_links=num_links+1 if the node is associated with the first node identifier or the second node identifier, otherwise, num_links is unchanged.

sum_link_width=sum_link_width between $C_a$ and $L_l$+new_link_width+sum_link_width between $C_n$ and $L_f$;

sum_num_links=sum_num_links between $C_a$ and $L_l$+1+ sum_num_links between $C_n$ and $L_f$;

min_sum_link_width=min_sum_link_width between $C_a$ and $L_l$+new_link_width+min_sum_link_width between $C_n$ and $L_f$, where $C_n$ is the current node being added, and $L_f$ is the node associated with the second node identifier when the current anchor node was previously in the anchored network of the node associated with the first node identifier, and $L_f$ is the node associated with the first node identifier when the current anchor node was previously in the anchored network of the node associated with the second node identifier.

The parameters num_links, sum_link_width, sum_num_links, min_sum_link_width are measurements of centrality, closeness, and strength between the anchor node and other nodes in the anchored network. The values of these parameters can be used to score anchored networks.

Similar to operation 1108, in an operation 1308, a node record of the current anchor node in the anchored network record is identified. Similar to operation 1110, in an operation 1310, a network score value is computed. Similar to operation 1112, in an operation 1312, an overall score value is computed. Similar to operation 1114, in an operation 1314, the node record of the current anchor node is updated. Similar to operation 1116, in an operation 1316, the anchored network record of the current anchor node is updated.

Operations 1300 to 1316 are repeated for each of the nodes identified in operation 1202 as the current anchor node. After operation 1204, processing continues in operation 1200 to process the next received link information.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and/or machine learning capabilities in a highly interactive programming environment, which may enable multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the description, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

receive scoring information from a second computing device for a node in a network of a plurality of nodes, the scoring information including a node identifier of the node and a score value, wherein the score value is determined using an analytic model configured to estimate a likelihood of an occurrence of an event, wherein each node included in the network of the plurality of nodes has an anchored network record created to represent a different entity relative to other nodes included in the network of the plurality of nodes, wherein each created anchored network record includes an anchored node record structure that includes a unique identifier of an anchor node as an anchor of a respective created anchored network record, a node score value for the respective anchor node, a network score value for the respective anchor node, and a linked subset of node records, wherein each node record of the linked subset of node records is associated with a linked node that is connected to the respective anchor node within a pre-defined maximum degree of separation value, wherein the linked subset of node records includes all nodes included in the network of the plurality of nodes that are within the pre-defined maximum degree of separation value relative to the respective anchor node, wherein each node record includes a linked node identifier of the linked node;

identify an anchored network record for which the node is the anchor node by matching the node identifier of the node to the unique identifier of the anchor node;

identify a node record from the linked subset of node records of the identified anchored network record by matching the node identifier of the node to the linked node identifier included in the node record;

compute an update for the network score value included in the identified node record using the score value;

update the identified node record stored by the computing device with the score value and the computed network score value to update the estimate of the likelihood of the occurrence of the event;

monitor a status of the different entity represented by the identified anchored network record based on the updated estimate of the likelihood of the occurrence of the event;

(a) select a next node of the linked subset of node records of the identified anchored network record that is not the anchor node of the identified anchored network record;

(b) identify a next anchored network record for which the selected next node is the anchor node by matching the linked node identifier of the selected next node to the unique identifier of the anchor node of the identified next anchored network record;

(c) identify a second node record for the node from the linked subset of node records included in the identified next anchored network record by matching the node identifier of the node to the linked node identifier included in the second node record;

(d) update the identified second node record stored by the computing device with the score value and the computed network score value; and repeat (a) through (d) with remaining nodes of the linked subset of node records of the identified anchored network record as the next node.

2. The non-transitory computer-readable medium of claim 1, wherein the scoring information further includes a network scoring algorithm identifier, wherein the network score value is computed using a network scoring algorithm with the score value as an input, wherein the network scoring algorithm is associated with the network scoring algorithm identifier.

3. The non-transitory computer-readable medium of claim 2, wherein the score value comprises a score vector comprising a plurality of score values defined based on the network scoring algorithm.

4. The non-transitory computer-readable medium of claim 1, wherein the computer-readable instructions further cause the computing device to compute a second network score value for the anchor node of the identified next anchored network record based on the computed network score value and to update the identified next anchored network record with the computed second network score value.

5. The non-transitory computer-readable medium of claim 4, wherein the scoring information further includes a network scoring algorithm identifier, wherein the network score value is computed using a network scoring algorithm with the score value as an input, wherein the network scoring algorithm is associated with the network scoring algorithm identifier.

6. The non-transitory computer-readable medium of claim 5, wherein the second network score value is computed using the network scoring algorithm with the computed network score value as the input.

7. The non-transitory computer-readable medium of claim 4, wherein the computer-readable instructions further cause the computing device to compute an overall score value included in the identified node record based on the computed network score value and the score value, wherein the identified node record is further updated with the computed overall score value.

8. The non-transitory computer-readable medium of claim 7, wherein the computer-readable instructions further cause the computing device to compute a second overall score value included in the identified next anchored network record based on the computed second network score value and the computed score value, wherein the identified next anchored network record is further updated with the computed second overall score value.

9. The non-transitory computer-readable medium of claim 7, wherein the scoring information further includes a network scoring algorithm identifier, wherein the network score value is computed using a network scoring algorithm with the score value as an input, wherein the network scoring algorithm is associated with the network scoring algorithm identifier.

10. The non-transitory computer-readable medium of claim 1, wherein, when an anchored network record is not identified, a new anchored network record is created for the node and added to the network of the plurality of nodes.

11. The non-transitory computer-readable medium of claim 1, wherein each node record of the linked subset of node records of the identified anchored network record comprises an indicator to indicate a number of degrees of separation between the anchor node of the identified anchored network record and a respective node.

12. The non-transitory computer-readable medium of claim 1, wherein each node record of the linked subset of node records of the identified anchored network record comprises an indicator to indicate whether or not a respective node record is the anchor node of the identified anchored network record.

13. The non-transitory computer-readable medium of claim 1, wherein each node record of the linked subset of node records of the identified anchored network record comprises a node score value for a respective node.

14. The non-transitory computer-readable medium of claim 1, wherein each node record of the linked subset of node records of the identified anchored network record comprises a node's network score value for a respective node.

15. The non-transitory computer-readable medium of claim 1, wherein an object store includes the anchored network record created for each node included in the network of the plurality of nodes.

16. The non-transitory computer-readable medium of claim 1, wherein the analytic model is configured to analyze data generated in a social network.

17. A system comprising:
a processor; and
a non-transitory computer-readable medium operably coupled to the processor, the computer-readable medium having computer-readable instructions stored thereon that, when executed by the processor, cause a computing device to
receive scoring information from a second computing device for a node in a network of a plurality of nodes, the scoring information including a node identifier of the node and a score value,
wherein the score value is determined using an analytic model configured to estimate a likelihood of an occurrence of an event,
wherein each node included in the network of the plurality of nodes has an anchored network record created to represent a different entity relative to other nodes included in the network of the plurality of nodes,
wherein each created anchored network record includes an anchored node record structure that includes a unique identifier of an anchor node as an anchor of a respective created anchored network record, a node score value for the respective anchor node, a network score value for the respective anchor node, and a linked subset of node records,
wherein each node record of the linked subset of node records is associated with a linked node that is connected to the respective anchor node within a pre-defined maximum degree of separation value,
wherein the linked subset of node records includes all nodes included in the network of the plurality of nodes that are within the pre-defined maximum degree of separation value relative to the respective anchor node,
wherein each node record includes a linked node identifier of the linked node;
identify an anchored network record for which the node is the anchor node by matching the node identifier of the node to the unique identifier of the anchor node;
identify a node record from the linked subset of node records of the identified anchored network record by matching the node identifier of the node to the linked node identifier included in the node record;
compute an update for the network score value included in the identified node record using the score value;
update the identified node record stored by the computing device with the score value and the computed network score value to update the estimate of the likelihood of the occurrence of the event;
monitor a status of the different entity represented by the identified anchored network record based on the updated estimate of the likelihood of the occurrence of the event;
(a) select a next node of the linked subset of node records of the identified anchored network record that is not the anchor node of the identified anchored network record;
(b) identify a next anchored network record for which the selected next node is the anchor node by matching the linked node identifier of the selected next node to the unique identifier of the anchor node of the identified next anchored network record;
(c) identify a second node record for the node from the linked subset of node records included in the identified next anchored network record by matching the node identifier of the node to the linked node identifier included in the second node record;
(d) update the identified second node record stored by the computing device with the score value and the computed network score value; and
repeat (a) through (d) with remaining nodes of the linked subset of node records of the identified anchored network record as the next node.

18. The system of claim 17, wherein, when an anchored network record is not identified, a new anchored network record is created for the node and added to the network of the plurality of nodes.

19. The system of claim 17, wherein each node record of the linked subset of node records of the identified anchored network record comprises a node's network score value for a respective node.

20. The system of claim 17, wherein the scoring information further includes a network scoring algorithm identifier, wherein the network score value is computed using a network scoring algorithm with the score value as an input, wherein the network scoring algorithm is associated with the network scoring algorithm identifier.

21. The system of claim 17, wherein the computer-readable instructions further cause the computing device to compute a second network score value for the anchor node of the identified next anchored network record based on the computed network score value and to update the identified next anchored network record with the computed second network score value.

22. The system of claim 17, wherein an object store includes the anchored network record created for each node included in the network of the plurality of nodes.

23. The system of claim 17, wherein each node record of the linked subset of node records of the identified anchored network record comprises an indicator to indicate whether or not a respective node record is the anchor node of the identified anchored network record.

24. A method of updating a score in a network of linked nodes, the method comprising:
receiving, by a computing device from a second computing device, scoring information for a node in a network of a plurality of nodes, the scoring information including a node identifier of the node and a score value,
wherein the score value is determined using an analytic model configured to estimate a likelihood of an occurrence of an event,
wherein each node included in the network of the plurality of nodes has an anchored network record created to represent a different entity relative to other nodes included in the network of the plurality of nodes, wherein each created anchored network record includes an anchored node record structure that includes a unique identifier of an anchor node as an anchor of a respective created anchored network record, a node score value for the respective anchor node, a network score value for the respective anchor node, and a linked subset of node records, wherein each node record of the linked subset of node records is associated with a linked node that is connected to the respective anchor node within a pre-defined maximum degree of separation value, wherein the linked subset of node records includes all nodes included in the network of the plurality of nodes that are within the pre-defined maximum degree of separation value relative to the respective anchor node, wherein each node record includes a linked node identifier of the linked node;

identifying, by the computing device, an anchored network record for which the node is the anchor node by matching the node identifier of the node to the unique identifier of the anchor node;

identifying, by the computing device, a node record from the linked subset of node records of the identified anchored network record by matching the node identifier of the node to the linked node identifier included in the node record;

computing, by the computing device, an update for a network score value included in the identified node record using the score value;

updating, by the computing device, the identified node record stored by the computing device with the score value and the updated network score value to update the estimate of the likelihood of the occurrence of the event;

monitoring a status of the different entity represented by the anchored network record based on the updated estimate of the likelihood of the occurrence of the event;

(a) selecting, by the computing device, a next node of the linked subset of node records of the identified anchored network record that is not the anchor node of the identified anchored network record;

(b) identifying, by the computing device, a next anchored network record for which the selected next node is the anchor node by matching the linked node identifier of the selected next node to the unique identifier of the anchor node of the identified next anchored network record;

(c) identifying, by the computing device, a second node record for the node from the linked subset of node records included in the identified next anchored network record by matching the node identifier of the node to the linked node identifier included in the second node record;

(d) updating, by the computing device, the identified second node record stored by the computing device with the score value and the computed network score value; and repeating, by the computing device, (a) through (d) with remaining nodes of the linked subset of node records of the identified anchored network record as the next node.

25. The method of claim 24, wherein, when an anchored network record is not identified, a new anchored network record is created for the node and added to the network of the plurality of nodes.

26. The method of claim 24, wherein each node record of the linked subset of node records of the identified anchored network record comprises a node's network score value for a respective node.

27. The method of claim 24, wherein the scoring information further includes a network scoring algorithm identifier, wherein the network score value is computed using a network scoring algorithm with the score value as an input, wherein the network scoring algorithm is associated with the network scoring algorithm identifier.

28. The method of claim 24, further comprising computing, by the computing device, a second network score value for the anchor node of the identified next anchored network record based on the computed network score value and updating, by the computing device, the identified next anchored network record with the computed second network score value.

29. The method of claim 24, wherein an object store includes the anchored network record created for each node included in the network of the plurality of nodes.

30. The method of claim 24, wherein each node record of the linked subset of node records of the identified anchored network record comprises an indicator to indicate whether or not a respective node record is the anchor node of the identified anchored network record.

* * * * *

UNITED STATES PATENT AND TRADEMARK OFFICE
CERTIFICATE OF CORRECTION

PATENT NO. : 10,243,831 B2
APPLICATION NO. : 14/228530
DATED : March 26, 2019
INVENTOR(S) : Brian Oneal Miles et al.

Page 1 of 1

It is certified that error appears in the above-identified patent and that said Letters Patent is hereby corrected as shown below:

In the Specification

Column 12, Line 10:
Delete the phrase "$[\Sigma_{i=1}^{N} W_1 * f1 + W_2 * f2]/N$" and replace with -- $[\Sigma_{i=1}^{N} W_1 * f1 + W_2 * f2]/N$ --.

Signed and Sealed this
Twenty-eighth Day of May, 2019

Andrei Iancu
*Director of the United States Patent and Trademark Office*